(12) United States Patent
Heigl et al.

(10) Patent No.: US 8,091,921 B2
(45) Date of Patent: Jan. 10, 2012

(54) GAS GENERATOR AND AIRBAG MODULE

(75) Inventors: Juergen Heigl, Boebingen (DE); Gerd Zischka, Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 274 days.

(21) Appl. No.: 11/897,161

(22) Filed: Aug. 29, 2007

(65) Prior Publication Data

US 2008/0054610 A1  Mar. 6, 2008

(30) Foreign Application Priority Data

Sep. 5, 2006 (DE) .................... 10 2006 041 611

(51) Int. Cl.
*B60R 21/262* (2011.01)
(52) U.S. Cl. ........................ 280/742; 280/740
(58) Field of Classification Search .............. 280/736, 280/730.1, 740, 741, 742, 730.2
See application file for complete search history.

(56) References Cited

U.S. PATENT DOCUMENTS

| | | | |
|---|---|---|---|
| 3,602,526 A * | 8/1971 | Brawn | 280/740 |
| 6,467,802 B2 * | 10/2002 | Heigl | 280/729 |
| 6,779,562 B2 * | 8/2004 | Tietze | 138/37 |
| 6,802,532 B2 * | 10/2004 | Heigl et al. | 280/736 |
| 6,848,708 B2 * | 2/2005 | Green et al. | 280/729 |
| 6,877,771 B2 * | 4/2005 | Weber | 280/742 |
| 7,354,062 B2 * | 4/2008 | Heigl | 280/740 |
| 7,597,351 B2 * | 10/2009 | Kashiwagi | 280/730.2 |
| 2004/0232664 A1 * | 11/2004 | Tokunaga et al. | 280/730.2 |
| 2006/0138760 A1 * | 6/2006 | Jang | 280/742 |
| 2007/0187937 A1 * | 8/2007 | Hsu et al. | 280/740 |

FOREIGN PATENT DOCUMENTS

| | | |
|---|---|---|
| DE | 19850448 | 5/2000 |
| DE | 20215541 | 3/2004 |
| DE | 202004019183 | 4/2005 |
| GB | 2406312 | 3/2006 |

* cited by examiner

*Primary Examiner* — Ruth Ilan
*Assistant Examiner* — Karen A Beck
(74) *Attorney, Agent, or Firm* — Tarolli, Sundheim, Covell & Tummino LLP

(57) ABSTRACT

A gas generator has an outer housing with a gas outlet section having an outer wall. The gas outlet section has a first and a second outflow area. Each outflow area has a net thrust outflow direction. The net thrust outflow direction of the first outflow area has a first component in the lengthwise direction of the gas generator and the net thrust outflow direction of the second outflow area has a second component in the lengthwise direction of the gas generator. The first component is oriented opposite to the second component. The gas generator is arranged in an airbag module in a way that gas from the first and second outflow areas is guided into different inflatable sections of a gas bag.

17 Claims, 3 Drawing Sheets

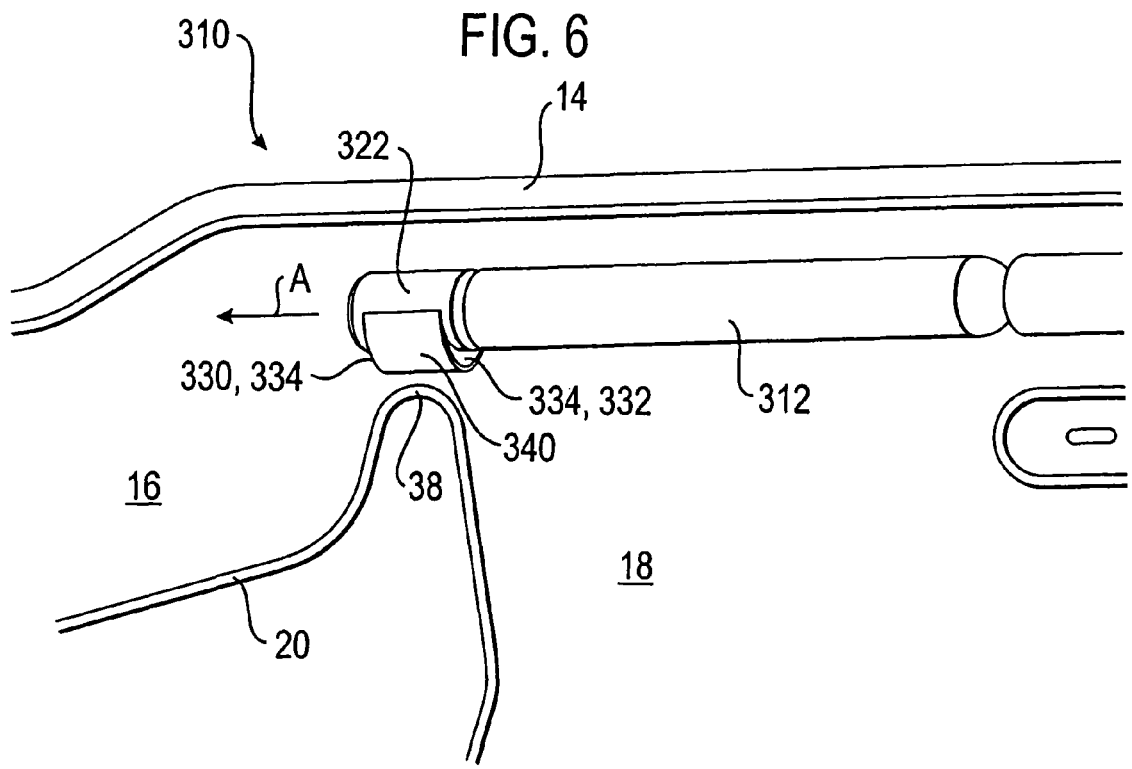
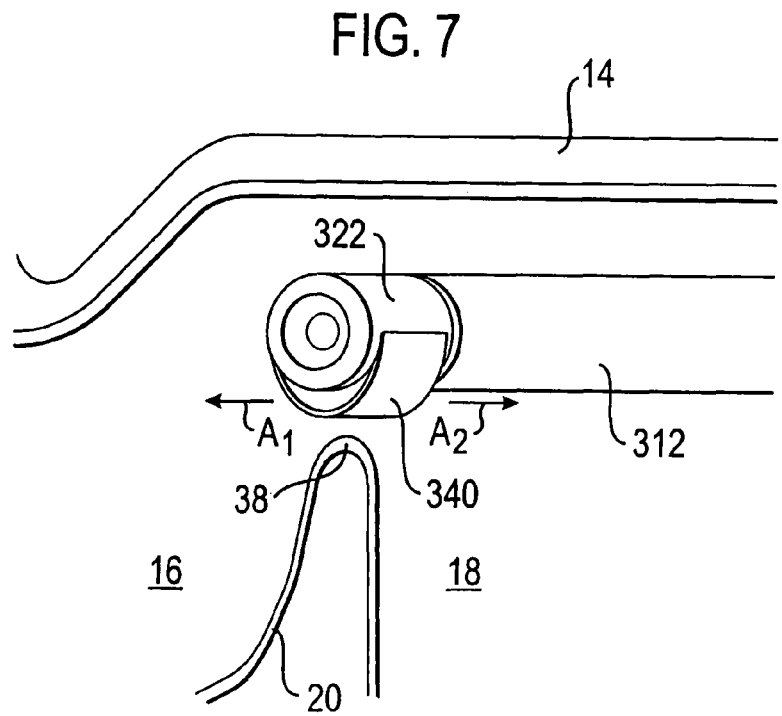

GAS GENERATOR AND AIRBAG MODULE

FIELD OF THE INVENTION

The invention relates to a gas generator.

BACKGROUND OF THE INVENTION

In order to better adapt airbags to their application purpose and concurrently to shorten the time needed for an airbag to assume its final position, the gas used for inflating the airbag is systematically divided into individual gas flows that are then fed in different directions into various inflatable sections of an airbag, formed by, for example, various chambers.

For this purpose, gas-guiding elements may be formed in the airbag itself. Further, separate components may be used into which the gas generator is inserted and that are provided, for instance, with differently oriented outflow nozzles. However, this configuration calls for additional work steps and a greater construction effort which ultimately makes the airbag module more expensive.

Moreover, when it comes to gas generators, it must be observed that the regulations of the Bundesanstalt für Materialforschung und-Prüfung (BAM) [German Federal Institute for Materials Research and Testing] require that, if a gas generator is ignited outside of the vehicle, for example, during transportation, it must behave thrust-neutrally, that is to say, it may not generate any momentum when the gas-generating material contained therein burns.

It is an object of the invention to create a thrust-neutral gas generator that is easy to accommodate in an airbag module.

BRIEF SUMMARY OF THE INVENTION

This object is achieved by a gas generator comprising an outer housing with a gas outlet section having an outer wall. The gas outlet section has a first and a second outflow area. Each outflow area has a net thrust outflow direction. The net thrust outflow direction of the first outflow area has a first component in the lengthwise direction of the gas generator and the net thrust outflow direction of the second outflow area has a second component in the lengthwise direction of the gas generator. The first component is oriented opposite to the second component. Therefore, the distribution and guidance of the gas flow is achieved directly by the design of the gas generator. An individual inflatable chamber of an airbag, for instance, can be associated with each of the outflow areas. Owing to the axial component of the gas flow, it is easier to guide the gas than with a purely radial outflow of the gas. Moreover, the gas generator can be designed to be essentially thrust-neutral if the components in the lengthwise direction of the net thrust outflow directions of the two outflow areas are selected identically.

The net thrust outflow direction of an outflow area is determined from the sum of all of the individual outflow momentums of the gas flows from individual outflow openings of the respective outflow area.

According to the invention, the gas generator itself is used to guide and distribute the gas, preferably without a need for additional parts to perform these functions.

The gas outlet section in the present invention is directly part of the gas generator and may form an integral part of the outer housing. Thus, it is not a separately installed, removable gas lance or another removable gas distribution element consisting, for example, of a hollow body with appropriate outflow openings that is subsequently installed onto the gas generator.

Advantageously, the outer housing of the gas generator is essentially tubular and elongated so that the gas generator can be inserted partially or entirely into an airbag.

Preferably, the gas outlet section is arranged at one end of the gas generator. Consequently, the other end of the gas generator can be configured for contacting an igniter.

Preferably, the first outflow area is arranged at a first end of the gas outlet section and the second outflow area at a second end of the gas outlet section. The spatial separation, even with a short gas outlet section, is sufficient to systematically make the gas flow into various sections of an airbag, since the two gas flows each have axial components.

The gas outlet section can be arranged, for example, in the outer wall of a filter chamber in which a filter material is held for purposes of purging the gas flows that leave the gas generator through the outflow areas of particles.

If a combustion chamber is provided in the gas generator, the gas outlet section may be adjacent to the combustion chamber in the axial direction. The gas outlet section could also be arranged directly in the area of the combustion chamber. Optionally, the filter chamber can be arranged radially between the combustion chamber and the gas outlet section, coaxially with the combustion chamber.

The gas flow that emerges from of a single one of the outflow areas, viewed in its entirety, is preferably conically shaped or forms a part of a conical surface. The opening angle of the cone can easily be predetermined by the design of the outflow area.

Each of the outflow areas has at least one individual outflow opening. In the normal case, each outflow area is formed by a group of individual outflow openings.

According to a preferred embodiment, the outer wall of the gas outlet section runs in the first and/or the second outflow area at an angle to the longitudinal axis of the gas generator. An angle between 90° and 35° has proven to be advantageous for this purpose.

In this case, the first and/or second outflow area preferably has a ring of outflow openings arranged along the periphery of the outer housing. The outflow openings can be created simply by means of openings in the outer wall of the gas generator.

Advantageously, one of the outflow areas lies at one axial end of the gas generator at which a slanted or perpendicular surface is available anyway, which can be used to form the outflow area.

In order to achieve the axial component of the net thrust outflow direction for the second outflow area, the second outflow area is preferably arranged in an indentation or in a wall of the outer housing of the gas generator that is slanted relative to the axial direction.

The indentation can be ring-shaped and arranged on the circumference of the gas generator, for example. In this manner, a ring-shaped outflow area is easily achieved in which preferably a collar of individual outflow openings is provided.

In another preferred embodiment, one or more outflow openings are in the form of a gill, especially formed by an inwardly directed, one side open indentation, also called a scoop gill.

The gill is advantageously configured in such a way that the outflow direction is at an obtuse angle relative to the longitudinal axis of the gas generator. Gills have proven their worth for guiding large volumes of gas in a desired direction, without greatly hindering the gas flow. In particular, gills are very well suited for achieving outflow directions with only a minor deviation from a longitudinal axis of the component in which the gill is arranged. The gills are plastically deformed sections of the outer housing whose width increases in direction towards a slit in the outer wall.

Both outflow areas may have gill-shaped outflow openings. The gills of the first and second outflow areas are then arranged in opposite directions. Thus, the directions of the thrust-inducing outflow directions can be established simply and systematically. However, it would also be possible to only provide gill-shaped outflow openings in one of the outflow areas.

According to a third embodiment, a circumferential section of the outer wall of the gas generator is curved radially towards the outside in the gas outlet section and preferably, at least one outflow area is formed at the edge of the circumferential section.

The circumferential section that is curved radially towards the outside can form an outflow channel that is open at both ends. With this design, a large amount of gas can be deflected by 90° relative to the radial direction of the gas generator and can be fed, for example, to two different inflatable chambers of an airbag.

This embodiment also offers a very good protection for the airbag since the escaping hot gas does not directly strike the airbag wall. Therefore, with this design, the measures for heat protection in the airbag can be reduced.

The gas generator according to the invention may e.g. be installed in a side airbag module arranged along the roof frame or in an airbag module for a backrest, a passenger-side airbag module or a knee-protection airbag module.

The invention also relates to an airbag module. Here, an airbag is provided with several inflatable sections, especially chambers, as well as a gas generator as described above. The gas generator is arranged in the airbag in such a way that gas is fed from the first or second outflow area into different inflatable sections of the airbag. Additional gas-guiding elements can be dispensed with, that is to say, elements that partially or completely surround the gas generator or components attached to the gas generator such as gas outlet nozzles or gas lances.

Preferably, a division that separates the airbag into two different inflatable sections is provided between the first and the second outflow areas. Since the two outflow areas are at a distance from each other, this can be used—together with the division of the airbag—to systematically distribute the gas coming from the gas generator to the individual inflatable sections of the airbag.

Virtually or completely dispensing with additional gas-guiding and gas-distributing components makes the airbag module according to the invention space-saving and light-weight. Consequently, it can also be used in vehicle areas and models where little space is available.

SHORT DESCRIPTION OF THE DRAWINGS

FIG. 6 shows a schematic depiction of an airbag module according to the invention with a gas generator according to the invention in a third embodiment; and FIG. 7 shows a schematic perspective view of the airbag module in FIG. 6.

DETAILED DESCRIPTION OF PREFERRED EMBODIMENTS

Figure 1:
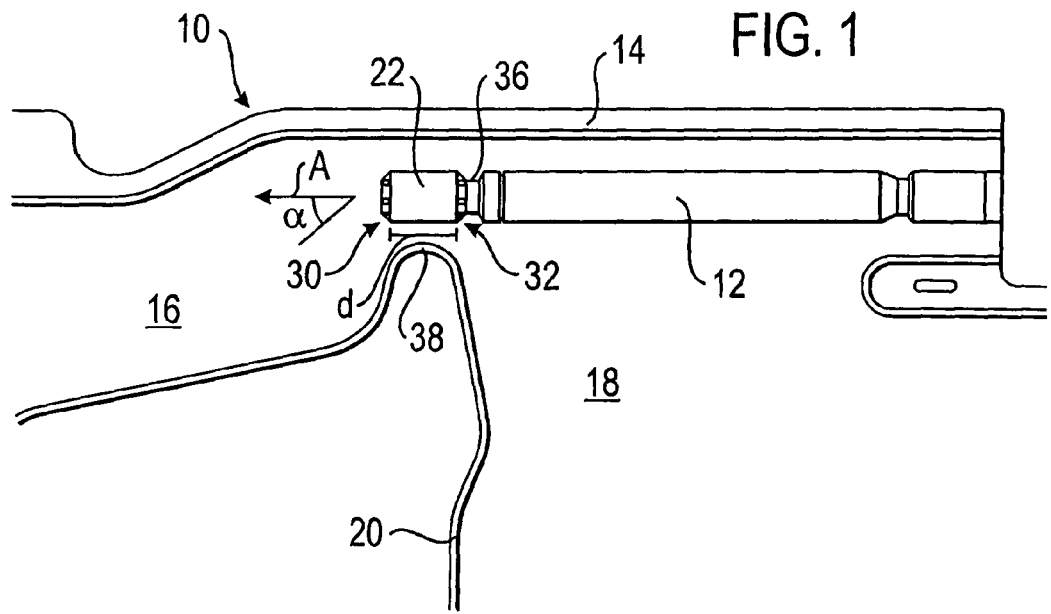
FIG. 1 shows a schematic view of an airbag module according to the invention with a gas generator according to the invention in a first embodiment.
Figure 2:
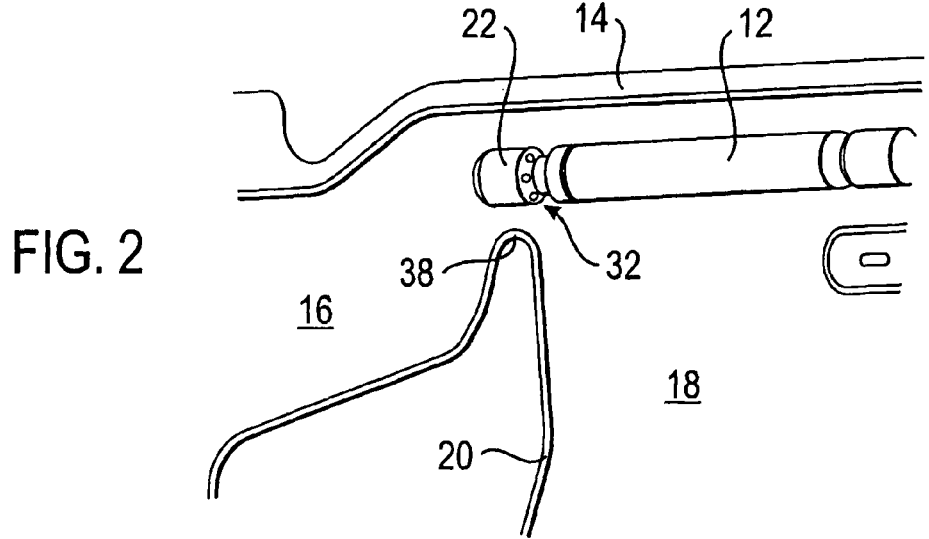
FIGS. 2 and 3 show different perspective views of the airbag module in FIG. 1.

FIG. 1 shows an airbag module 10 of a vehicle occupant restraint system. The airbag module 10 has a gas generator 12, in the case shown here, an elongated tubular gas generator with an essentially cylindrical outer housing. The gas generator 12 may be a solid fuel gas generator, a liquid fuel gas generator or else a hybrid form.

The gas generator 12 is arranged at least largely inside an airbag 14.

In the example shown, the airbag 14 is a side curtain airbag of the type used in the region of a roof frame of a vehicle. The airbag 14 has several inflatable sections 16, 18 that are separated from each other in a known manner by non-inflatable sections 20, for example, seams or interwoven segments.

At its axial end situated in the airbag 14, the gas generator 12 has a gas outlet section 22 that, in this embodiment, extends over almost one-fifth of the axial length of the gas generator 12. The gas outlet section 22 is part of the gas generator 12, especially part of the outer housing of the gas generator 12, which cannot be dismantled non-destructively. It may be an integral part of the outer housing of the gas generator 12.

In the example shown (see FIG. 5), the gas outlet section 22 is part of a filter chamber 24 that is adjacent to a combustion chamber 26 of the gas generator 12 in the lengthwise direction A (below also referred to as the axial direction A). Fuel is indicated by individual tablets in the combustion chamber 26. Filter material 28 is present in the filter chamber 24 in order to purge a gas flow of particles, which is indicated by arrows.

The filter chamber 24 could also surround the combustion chamber 26 coaxially. The filter material 28 or the filter chamber 24 could be dispensed with if fuels that burn residue-free are used or in the case of liquid gas generators.

The outer wall of the gas outlet section 22 has a first outflow area 30 and a second outflow area 32 distanced from the first one in the lengthwise direction A. The distance d between the two outflow areas 30, 31 here amounts to several centimeters.

Figure 3:
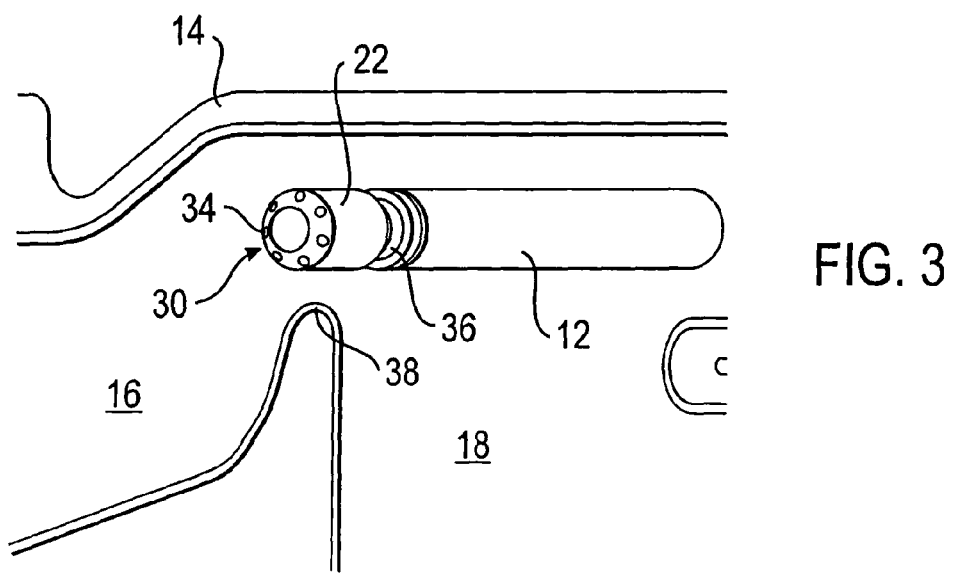

Individual outflow openings 34 are arranged in each of the outflow areas 30, 32 (for the sake of clarity, only one single outflow opening is marked in FIG. 3).

In both outflow areas 30, 32, the outer wall of the gas outlet section 22 is oriented obliquely to the lengthwise direction A of the gas generator 12.

The individual outflow openings 34 are each round here. Each outflow area 30, 32 has a ring of outflow openings 34 that is coaxial with the longitudinal axis A, so that all in all, each outflow area 30, 32 can be considered to be ring-shaped.

Each outflow area 30, 32 imparts the gas flowing out of the gas generator 12 with a predefined net thrust outflow direction that results from the sum of all of the individual outflow momentums of the gas flows from the individual outflow openings 34. The net thrust outflow direction of each outflow area 30, 32, in turn, has an axially oriented component $A_1, A_2$. If the outflow openings 34 in the outflow area 30, 32—as shown here—are distributed symmetrically around the longitudinal axis A or, to put it more precisely, if the gas outflow from the appertaining outflow area 30, 32 is rotation-symmetrical around the longitudinal axis A, then the net thrust is exactly in the axial direction A. A deviation from this direction occurs, for example, if individual outflow openings 34 are closed due to the installation of the gas generator 12 in the airbag module 10.

The axial components $A_1$, $A_2$ of the net thrust outflow directions of the two outflow areas 30, 32 are oriented oppositely and are preferably opposite by precisely 180°. Preferably, these components $A_1$, $A_2$ are of exactly the same magnitude so that the gas generator 12 is entirely thrust-neutral, that is to say, if the gas generator 12 is ignited outside of the airbag module 10, it does not develop any momentum.

The first outflow area 30 is formed directly at the axial end of the gas generator 12 that lies inside the airbag 14. In the example shown, the first outflow area 30 is formed by an axial end of the outflow area 30 that tapers conically by an angle α relative to the axial direction. The outflow openings 34 of the first outflow area 30 are arranged in this ring-shaped section.

The second outflow area 32 is likewise formed in a ring-shaped, conical slant of the outer wall of the gas outlet section 22. An indentation 36 is provided in the outer wall of the gas generator 12 that, in the example shown, encircles the gas generator 12 in the shape of a ring. The second outflow area 32 is formed in the side wall of the indentation 36 which lies in the direction of the first outflow area 30, so that the two outflow areas 30, 32 face away from each other. The second outflow area 32 is likewise slanted by an angle α relative to the longitudinal axis A (also see FIG. 5, lower half).

The angle α shown for the first and second outflow areas 30, 32 relative to the axial direction A is about 40°. However, this angle could also be selected so as to be narrower or much steeper, for example, between 35° and 90°.

The indentation 36 is selected to be so wide in the axial direction A that the gas can flow out of the second outflow area 32 without being hindered.

When the gas generator 12 is activated, a signal is sent to an igniter 37 which ignites the gas-generating material inside the gas generator 12. The gas being formed leaves the gas generator 12 through the outflow openings 34 of the two outflow areas 30, 32.

In this process, each outflow area 30, 32 develops an essentially conically shaped gas flow. The two cones α are oriented away from each other (see FIG. 5). The opening angle of each cone is defined by the slant of the outflow area 30, 32.

Here, the net thrust outflow direction of each outflow area 30, 32 lies exactly on the longitudinal axis A.

The gas generator 12 is arranged in the airbag 14 in such a way that the gas outlet section 22 lies in the area of a division 38 that is formed by a non-inflatable section 20 of the airbag 14 and that separates inflatable sections 16, 18 from each other. The division 38 is arranged between the first and the second outflow areas 30, 32. The position of the gas generator 12 is selected in such a way that the outflow area 30 is oriented towards the inflatable section 16 while the second outflow area 32 is oriented towards the second inflatable section 18.

The gas flowing out of the gas generator 12 is thus distributed without any further auxiliary means directly onto the two inflatable sections 16, 18. Since the outflow is at least approximately conical and thus takes place with an axial component in each case, the flow against the airbag wall in the vicinity of the outflow areas 30, 32 is not as strong as is the case with gas generators that flow out purely radially.

Figure 4:
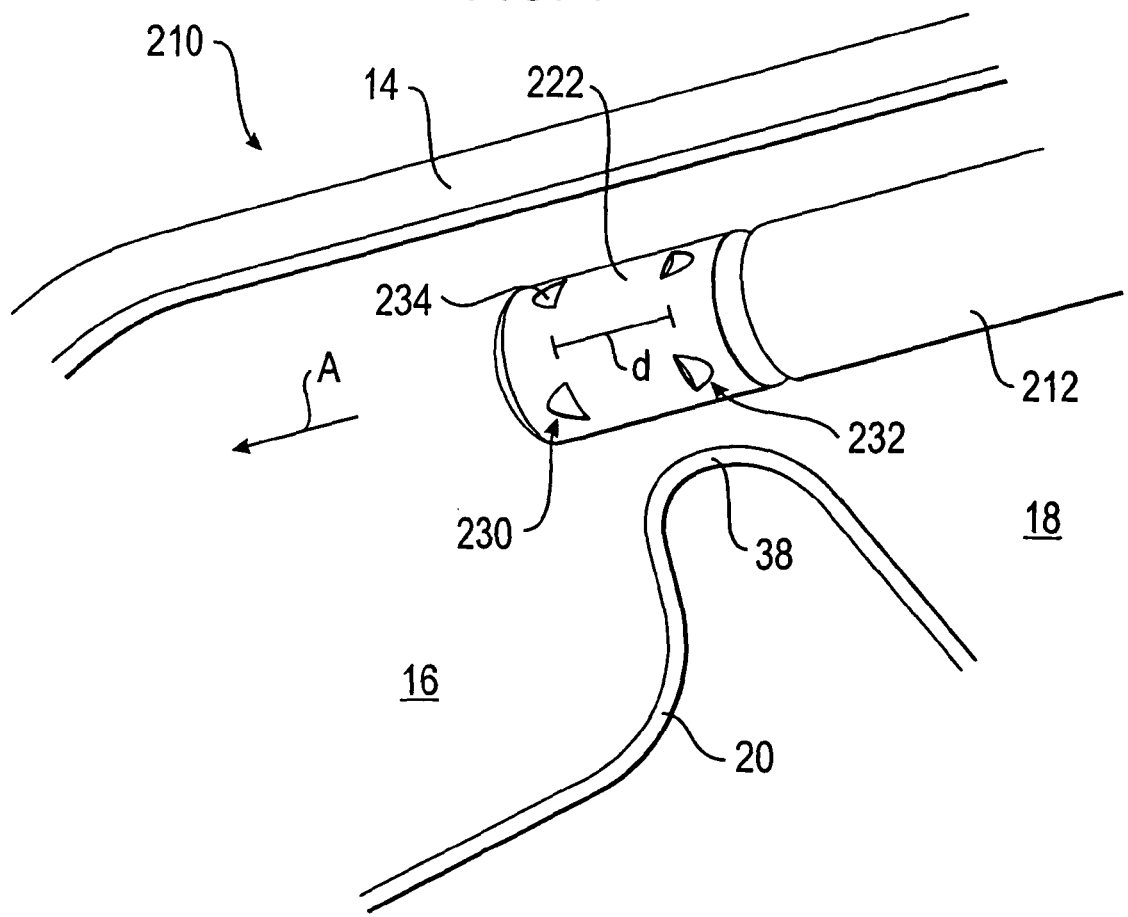
FIG. 4 shows a schematic view of an airbag module according to the invention with a gas generator according to the invention in a second embodiment.
Figure 5:
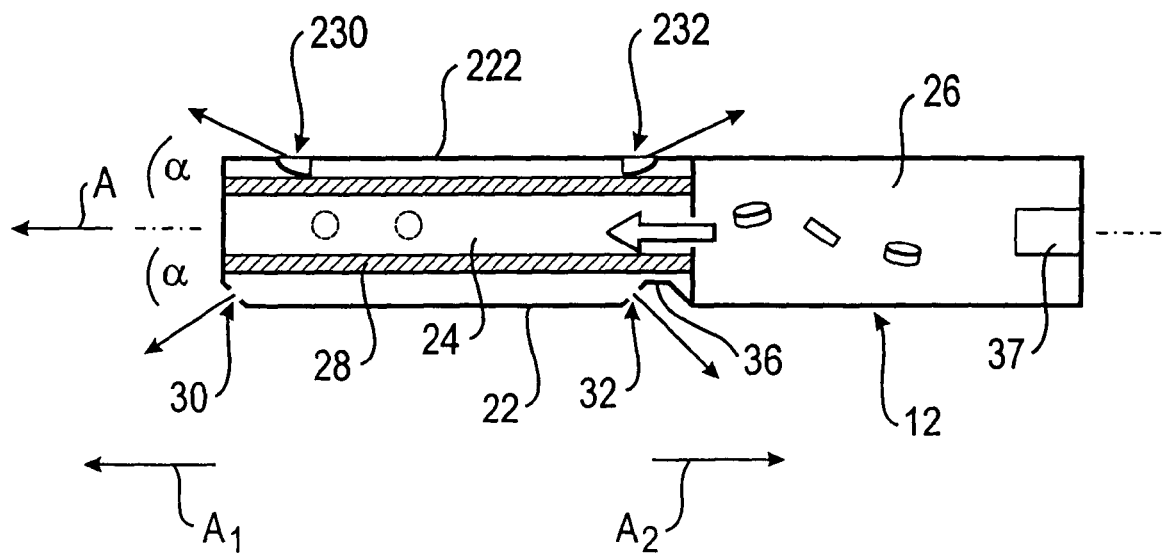
FIG. 5 shows a schematic sectional view of a gas generator according to the invention, the lower half showing the embodiment of FIGS. 1 and 3, and the upper half showing the embodiment of FIG. 4.

The second embodiment shown in FIGS. 4 and 5 (top half is identical in many aspects to the one just described.

However, the individual outflow openings 234 in the two outflow areas 230, 323 are configured in the form of gills. The gills are formed in that sections of the outer wall of the outer housing of the gas generator 12 are indented into the interior of the gas generator 12, one side of the gill oriented perpendicular to the longitudinal axis A being formed by a slit in the outer wall (so-called scoop gills are formed). The gas flowing through the gas generator 12 strikes the slanted surface that leads to the outside and is thus discharged from the gas generator 12 at an angle.

Here, the gills of an outflow area 230, 232 are each arranged in a ring section and symmetrically around the outer circumference of the gas generator 12.

The axial distance d of the two outflow areas 230, 232 is preferably several centimeters here as well.

As in the first example, here, too, a net thrust outflow direction results for each of the outflow areas 230, 232, each having an axially oriented component $A_1$, $A_2$, said components $A_1$, $A_2$ being oriented oppositely by 180° and preferably having the same magnitude. Consequently, the gas generator 212 is also thrust-neutral.

The gills make it possible to achieve an outflow with a very strong axial orientation, that is to say, a narrow angle of the outflow cone, which can prevent or reduce the flow striking the airbag walls. The angle between the gas flow coming from the outflow openings 234 and the longitudinal axis A here is preferably smaller than in the first example and lies, for example, between 20° and 45°.

It is up to the discretion of the person skilled in the art to combine the individual features of the two embodiments just described here. In particular, it would be possible to configure one of the outflow areas according to one embodiment and the other according to the other embodiment. Of course, care should be taken here that the net thrust outflow directions are oriented opposite from each other and that they are of the same magnitude.

In the third embodiment shown in FIGS. 6 and 7, the gas outlet section 322 is configured differently than in the embodiments described above. Here, the gas outlet section 322 is created in that, in order to form the outflow openings 334, a circumferential section 340 of the outer wall of the gas generator 12 is cut at two places in the circumferential direction and is bent radially towards the outside. This forms a flow channel with two axially oriented outflow openings 334.

In this example, the gas leaves the gas generator 312 practically only in opposite axial directions $A_1$, $A_2$.

Both outflow openings 334, forming the first and the second outflow area 330, 332 respectively, are of the same size in the example shown. Here, too, the net thrust outflow directions or their axial components $A_1$, $A_2$ are opposite and have the same magnitude. However, through a slanted position of the bent-out section of the outer wall, it would also be possible to create an asymmetry of the outflow directions and gas quantities.

FIGS. 6 and 7 show only one circumferential section 340 that is bent towards the outside, but several such sections could also be provided in the gas outlet section 322 along the circumference of the gas generator 12.

A combination with features of the other two embodiments is up to the discretion of the person skilled in the art.

A distribution of the gas flow exiting from the individual outflow areas that is not a 50:50 distribution could be achieved through choosing an appropriate number and shape of the individual outflow openings in the outflow areas, for example, through the depth and number of gills or the size and/or number of outflow openings. Here, however, care should be taken to ensure that the thrust-neutrality is at least largely retained.

The invention claimed is:

1. A gas generator comprising an outer housing having a gas outlet section (22; 222; 322) with an outer wall, the gas outlet section (22; 222; 322) being an integral part of the gas generator such that the gas generator itself is used to guide and distribute the gas, the gas outlet section (22; 222; 322) with the outer wall having a first and a second outflow area (30, 32; 230, 232; 330, 332), and each outflow area (30, 32; 230, 232; 330, 332) having a net thrust outflow direction, wherein the gas outlet section (22; 222; 322) is arranged in the outer wall of a filter chamber (24) for purging a gas flow leaving the gas generator (12; 212; 312) through the outflow areas (30, 32; 230, 232; 330, 332);

the net thrust outflow direction of the first outflow area (30; 230; 330) having a first component (A1) in the lengthwise direction (A) of the gas generator (12; 212; 312), the net thrust outflow direction of the second outflow area (32; 232; 332) having a second component (A2) in the lengthwise direction (A) of the gas generator (12; 212; 312), the first component (A1) being oriented opposite to the second component (A2).

2. The gas generator according to claim 1, wherein the gas outlet section (22; 222; 322) is arranged at one end of the gas generator (12; 212; 312).

3. The gas generator according to claim 1, wherein the first outflow area (30; 230; 330) is arranged at a first end of the gas outlet section (22; 222; 322) and the second outflow area (32; 232; 332) at a second end of the gas outlet section (22; 222; 322).

4. The gas generator according to claim 1, wherein the outer housing of the gas generator (12; 212; 312) is essentially tubular and elongated.

5. The gas generator according to claim 1, wherein a combustion chamber (26) is provided in the gas generator (12; 212; 312) and the gas outlet section (22; 222; 322) is arranged adjacent to the combustion chamber in the axial direction (A).

6. The gas generator according to claim 1, wherein the gas flow flowing out of each of the outflow areas (30, 32; 230, 232) has a conical shape.

7. The gas generator according to claim 1, wherein each outflow area (30, 32; 230, 232; 330, 332) has at least one individual outflow opening (34; 234; 334).

8. The gas generator according to claim 1, wherein the outer wall of the gas outlet section (22) runs in at least one of the first and the second outflow area (30, 32) at an angle to the longitudinal axis (A) of the gas generator (12).

9. The gas generator according to claim 1, wherein at least one of the first and the second outflow area (30, 32) has a ring of outflow openings (34).

10. The gas generator according to claim 1, wherein the second outflow area (32) is arranged in an indentation (36) of the outer housing of the gas generator (12).

11. The gas generator according to claim 10, wherein the indentation (36) is ring-shaped and arranged on the circumference of the gas generator (12).

12. The gas generator according to claim 1, wherein the outflow opening (234) is gill-shaped.

13. The gas generator according to claim 12, wherein the gill is configured in such a way that the outflow direction is at an obtuse angle relative to the longitudinal axis (A) of the gas generator (212).

14. The gas generator according to claim 1, wherein a circumferential section (340) of the outer wall is curved radially towards the outside in the gas outlet section (340).

15. The gas generator according to claim 14, wherein at least one outflow area (330, 332) is formed at the edge of the circumferential section (340).

16. The gas generator according to claim 14, wherein the circumferential section (340) curved radially towards the outside forms an outflow channel that is open at both ends.

17. A gas generator comprising an outer housing having a gas outlet section (22; 222; 322) with an outer wall, the gas outlet section (22; 222; 322) being an integral part of the gas generator such that the gas generator itself is used to guide and distribute the gas, the gas outlet section (22; 222; 322) with the outer wall having a first and a second outflow area (30, 32; 230, 232; 330, 332), and each outflow area (30, 32; 230, 232; 330, 332) having a net thrust outflow direction, the net thrust outflow direction of the first outflow area (30; 230; 330) having a first component (A1) in the lengthwise direction (A) of the gas generator (12; 212; 312), the net thrust outflow direction of the second outflow area (32; 232; 332) having a second component (A2) in the lengthwise direction (A) of the gas generator (12; 212; 312), the first component (A1) being oriented opposite to the second component (A2), wherein the outflow openings (234) are gill-shaped, and wherein gills of the first and second outflow areas (230, 232) open in opposite directions.

* * * * *